United States Patent
Hu et al.

(10) Patent No.: US 11,871,269 B2
(45) Date of Patent: Jan. 9, 2024

(54) PUNCTURING INFORMATION INDICATION METHOD AND COMMUNICATION APPARATUS

(71) Applicant: HUAWEI TECHNOLOGIES CO., LTD., Guangdong (CN)

(72) Inventors: Mengshi Hu, Shenzhen (CN); Jian Yu, Shenzhen (CN); Ming Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/345,409

(22) Filed: Jun. 30, 2023

(65) Prior Publication Data

US 2023/0345302 A1  Oct. 26, 2023

Related U.S. Application Data

(63) Continuation of application No. 17/860,860, filed on Jul. 8, 2022, which is a continuation of application No. PCT/CN2021/071095, filed on Jan. 11, 2021.

(30) Foreign Application Priority Data

Jan. 11, 2020 (CN) .......................... 202010028613.1

(51) Int. Cl.
*H04W 28/06* (2009.01)

(52) U.S. Cl.
CPC .................................. *H04W 28/06* (2013.01)

(58) Field of Classification Search
CPC ..... H04L 5/001; H04L 5/0073; H04L 5/0053; H04W 28/06
See application file for complete search history.

(56) References Cited

U.S. PATENT DOCUMENTS

| 2017/0041171 A1 | 2/2017 | Li et al. |
| 2019/0007180 A1 | 1/2019 | Shi et al. |

(Continued)

FOREIGN PATENT DOCUMENTS

| CN | 109644103 A | 4/2019 |
| CN | 109996343 A | 7/2019 |

(Continued)

OTHER PUBLICATIONS

IEEE Std 802.11-2016, "IEEE Standard for Information Technology-Telecommunications and Information Exchange Between Systems Local and Metropolitan Area Networks-Specific Requirements, Part 11: Wireless LAN Medium Access Control (MAC) and Physical Layer (PHY) Specifications," Dec. 7, 2016, 3534 pages.

(Continued)

*Primary Examiner* — Syed Ali
(74) *Attorney, Agent, or Firm* — Fish & Richardson P.C.

(57) ABSTRACT

This disclosure discloses puncturing information indication methods and communication apparatuses. In an implementation, a method comprises generate a physical layer protocol data unit (PPDU) comprising a preamble, wherein the preamble comprises preamble puncturing information carried by a content channel and indicates preamble puncturing status of subchannels of a bandwidth of the PPDU, wherein the content channel is distributed on some subchannels of the bandwidth of the PPDU, and a bandwidth of the content channel is less than the bandwidth of the PPDU, and send the PPDU.

8 Claims, 19 Drawing Sheets

(56) References Cited

U.S. PATENT DOCUMENTS

| | | | | |
|---|---|---|---|---|
| 2022/0255681 A1* | 8/2022 | Huang | ............... | H04L 5/0055 |
| 2022/0278778 A1* | 9/2022 | Kim | ............... | H04L 1/1816 |
| 2022/0294558 A1* | 9/2022 | Park | ............... | H04L 5/0044 |
| 2022/0312521 A1* | 9/2022 | Song | ............... | H04L 5/00 |
| 2023/0003005 A1* | 1/2023 | Verma | ............... | H04W 52/50 |
| 2023/0199551 A1* | 6/2023 | Kim | ............... | H04W 76/15 |
| | | | | 370/229 |
| 2023/0217521 A1* | 7/2023 | Kim | ............... | H04W 88/02 |
| | | | | 370/329 |
| 2023/0224989 A1* | 7/2023 | Kim | ............... | H04W 88/06 |
| | | | | 370/329 |

FOREIGN PATENT DOCUMENTS

| | | |
|---|---|---|
| EP | 4102764 A1 | 12/2022 |
| WO | 2019137419 A1 | 7/2019 |
| WO | 2019240792 A1 | 12/2019 |

OTHER PUBLICATIONS

IEEE P802.11ax/D4.3, "Draft Standard for Information Technology-Tele-Communications and Information Exchange Between Systems Local and Metropolitan Area Networks—Specific Requirements, Part 11: Wireless LAN Medium Access Control (MAC) and Physical Layer (PHY) Specifications," Aug. 2019, 782 pages.

International Search Report and Written Opinion in International Appln. No. PCT/CN2021/071095, dated Mar. 26, 2021, 17 pages (with English translation).

Au, "Specification framework for TGbe," IEEE 802.11-19/1262r22, Jan. 6, 2021, 105 pages.

Extended European Search Report in European Appln No. 21738891. 7, dated Jan. 5, 2023, 15 pages.

Vermani et al., "Further Ideas on EHT Preamble Design," IEEE 802.11-19/1870r4, Nov. 11, 2019, 18 pages.

Office Action in Japanese Appln. No. 2022-542354, dated Sep. 12, 2023, 11 pages (with English translation).

* cited by examiner

| 20 MHz | L-STF legacy short training field | L-LTF legacy long training field | L-SIG legacy signaling field | RL-SIG repeated legacy signal field | U-SIG universal signaling field | EHT-SIG extremely high throughput signaling field | ... |
|---|---|---|---|---|---|---|---|
| 20 MHz | ///// | ///// | ///// | ///// | ///// | ///// | ///// |
| 20 MHz | L-STF | L-LTF | L-SIG | RL-SIG | U-SIG | EHT-SIG | ... |
| 20 MHz | L-STF | L-LTF | L-SIG | RL-SIG | U-SIG | EHT-SIG | ... |

FIG. 5

| Bit | 4 | 6 | 4 | 2 | 4 | 6 |
|---|---|---|---|---|---|---|
| U-SIG symbol 1 | Version of a physical layer protocol data unit | Basic service set color | Location indication information | Reserved | Cyclic redundancy code | Tail bit |

FIG. 6a

| Bit | 4 | 6 | 3 | 7 | 4 | 2 |
|---|---|---|---|---|---|---|
| U-SIG symbol 1 | Version of a physical layer protocol data unit | Basic service set color | Format of a PPDU | Transmission opportunity | Location indication information | Reserved |

FIG. 6b

| Bit | 3 | 7 | 1 | 5 | 4 | 6 |
|---|---|---|---|---|---|---|
| U-SIG symbol 2 | Format of a physical layer protocol data unit | Transmission opportunity | Uplink/ Downlink | Reserved | Cyclic redundancy code | Tail bit |

FIG. 7a

| Bit | 3 | 13 | 4 | 6 |
|---|---|---|---|---|
| U-SIG symbol 2 | Uplink/ Downlink | Reserved | Cyclic redundancy code | Tail bit |

FIG. 7b

| 20 MHz | L-STF | L-LTF | L-SIG | RL-SIG | U-SIG | SIG1 | SIG2 | ... |
|---|---|---|---|---|---|---|---|---|
| 20 MHz | ///// | ///// | ///// | ///// | ///// | ///// | ///// | ///// |
| 20 MHz | L-STF | L-LTF | L-SIG | RL-SIG | U-SIG | SIG1 | SIG2 | ... |
| 20 MHz | L-STF | L-LTF | L-SIG | RL-SIG | U-SIG | SIG1 | SIG2 | ... |

FIG. 8

Bit:    2           4

| Mode indication | Corresponding indication |
|---|---|

FIG. 11

| Bit | x | y | z |
|---|---|---|---|
| Indication field | Mode indication | Corresponding indication (including a bandwidth) | |

FIG. 20

PUNCTURING INFORMATION INDICATION METHOD AND COMMUNICATION APPARATUS

CROSS-REFERENCE TO RELATED APPLICATIONS

This application is a continuation of U.S. patent application Ser. No. 17/860,860, filed on Jul. 8, 2022, which is a continuation of International Application No. PCT/CN2021/071095, filed on Jan. 11, 2021, which claims priority to Chinese Patent Application No. 202010028613.1, filed on Jan. 11, 2020. All of the afore-mentioned patent applications are hereby incorporated by reference in their entireties.

TECHNICAL FIELD

This application relates to the field of communication technologies, and in particular, to a puncturing information indication method and a communication apparatus.

BACKGROUND

There are many generations of wireless local area network (WLAN) standards after development over years, including 802.11a/b/g, 802.11n, 802.11ac, 802.11ax, and the like, and 802.11be has been discussed.

In terms of bandwidth configurations, 802.11ax supports the following bandwidth configurations: 20 MHz, 40 MHz, 80 MHz, 160 MHz, and 80+80 MHz. For example, in 802.11ax, when a bandwidth is configured as 160 MHz, channel division is shown in FIG. 1. In this case, if a secondary 20 MHz channel is occupied, a transmit end may send preamble puncturing information to a receive end to avoid incorrect receiving by the receive end on the secondary 20 MHz channel.

Therefore, how the transmit end sends the preamble puncturing information to enable the receive end to obtain the preamble puncturing information is still a problem that needs to be resolved.

SUMMARY

This application provides a puncturing information indication method and a communication apparatus, so that preamble puncturing information can be sent on a first content channel. This avoids sending the preamble puncturing information on all subchannels, and reduces signaling overheads.

According to a first aspect, this application provides a puncturing information indication method, including:

generating a physical layer protocol data unit (PHY protocol data unit, PPDU) including a preamble, where the preamble includes preamble puncturing information; and sending the preamble puncturing information on a first content channel, where a total bandwidth of the first content channel is less than a bandwidth of the PPDU.

In this embodiment of this application, content carried on the first content channel is the preamble puncturing information, and the first content channel is distributed on some channels of the PPDU. For example, the first content channel may be distributed on some consecutive subchannels of the PPDU, or the first content channel may be distributed on some inconsecutive subchannels of the PPDU.

According to the technical solution provided in this application, the preamble puncturing information is sent on the first content channel, and the total bandwidth of the first content channel is less than the bandwidth of the PPDU. In other words, a transmit device reuses some subchannels of the PPDU to send the preamble puncturing information. Compared with a manner in which the preamble puncturing information is sent on all subchannels of the PPDU under indication by specially using one field, this method can reduce signaling overheads.

According to a second aspect, this application provides a puncturing information indication method, including:

receiving preamble puncturing information on a first content channel, where the preamble puncturing information is included in a preamble of a physical layer protocol data unit (PHY protocol data unit, PPDU), and a total bandwidth of the first content channel is less than a bandwidth of the PPDU; and determining a usage status of a channel of the PPDU based on the preamble puncturing information.

In a possible implementation of the first aspect or the second aspect, the preamble further includes location indication information, and the location indication information indicates a frequency domain location of the first content channel.

According to the technical solution provided in this application, a receive device may obtain, by using the location indication information, the frequency domain location of the first content channel, to receive the preamble puncturing information on the first content channel.

In a possible implementation of the first aspect or the second aspect, the location indication information is located in a universal (universal-SIG, U-SIG) field, and the preamble puncturing information is located in a field after the U-SIG field.

In a possible implementation of the first aspect or the second aspect, the first content channel includes an odd-numbered subchannel, the first content channel includes an even-numbered subchannel, or the first content channel includes a specified subchannel, where a bandwidth of a subchannel is a fixed value.

In this embodiment of this application, the bandwidth of the subchannel may be 10 MHz, 20 MHz, 30 MHz, 40 MHz, or the like. The frequency domain location of the first content channel may be preset, or may be indicated by the location indication information.

In a possible implementation of the first aspect or the second aspect, if the first content channel includes a subchannel corresponding to a secondary 40 MHz bandwidth, the bandwidth of the PPDU is 80 MHz; if the first content channel includes a subchannel corresponding to a second secondary 80 MHz bandwidth, the bandwidth of the PPDU is 160 MHz; if the first content channel includes a subchannel corresponding to a third secondary 80 MHz bandwidth, the bandwidth of the PPDU is 240 MHz; and if the first content channel includes a subchannel corresponding to a secondary 160 MHz bandwidth, the bandwidth of the PPDU is 320 MHz.

A first secondary 80 MHz bandwidth may be understood as a first 80 MHz bandwidth on which a primary 20 MHz bandwidth is located.

Optionally, the first content channel may further include an odd-numbered subchannel, an even-numbered subchannel, or a specified subchannel corresponding to the secondary 40 MHz bandwidth.

According to a third aspect, this application provides a communication apparatus, configured to perform the method according to any one of the first aspect or the possible implementations of the first aspect. Specifically, the communication apparatus includes a corresponding unit that performs the method according to any one of the first aspect or the possible implementations of the first aspect.

According to a fourth aspect, this application provides a communication apparatus, configured to perform the method according to any one of the second aspect or the possible implementations of the second aspect. Specifically, the communication apparatus includes a corresponding unit that performs the method according to any one of the second aspect or the possible implementations of the second aspect.

According to a fifth aspect, this application provides a computer-readable storage medium, configured to store a computer program used to perform the first aspect and the possible implementations of the first aspect.

According to a sixth aspect, this application provides a computer-readable storage medium, configured to store a computer program used to perform the second aspect and the possible implementations of the second aspect.

According to a seventh aspect, this application provides a computer program product, including computer code or instructions. When the computer code or the instructions is/are run, the method according to any one of the first aspect or the possible implementations of the first aspect is implemented.

According to an eighth aspect, this application provides a computer program product, including computer code or instructions. When the computer code or the instructions is/are run, the method according to any one of the second aspect or the possible implementations of the second aspect is implemented.

According to a ninth aspect, this application provides a computer program, configured to perform the first aspect and the possible implementations of the first aspect.

According to a tenth aspect, this application provides a computer program, configured to perform the second aspect and the possible implementations of the second aspect.

According to an eleventh aspect, this application provides a wireless communication system, including a transmit device and a receive device. The transmit device is configured to perform the first aspect and the possible implementations of the first aspect, and the receive device is configured to perform the second aspect and the possible implementations of the second aspect.

BRIEF DESCRIPTION OF DRAWINGS

FIG. 5 is a schematic diagram of formats of some fields of a PPDU according to an embodiment of this application;

FIG. 6a is a schematic diagram of a format of a first symbol of a universal field according to an embodiment of this application;

FIG. 6b is a schematic diagram of a format of a first symbol of a universal field according to an embodiment of this application;

FIG. 7a is a schematic diagram of a format of a second symbol of a universal field according to an embodiment of this application;

FIG. 7b is a schematic diagram of a format of a second symbol of a universal field according to an embodiment of this application;

FIG. 8 is a schematic diagram of division of a field after a universal field of a PPDU according to an embodiment of this application;

FIG. 11 is a schematic diagram of a structure of location indication information according to an embodiment of this application;

FIG. 20 is a schematic diagram of a structure of location indication information according to an embodiment of this application;

DESCRIPTION OF EMBODIMENTS

Figure 1:
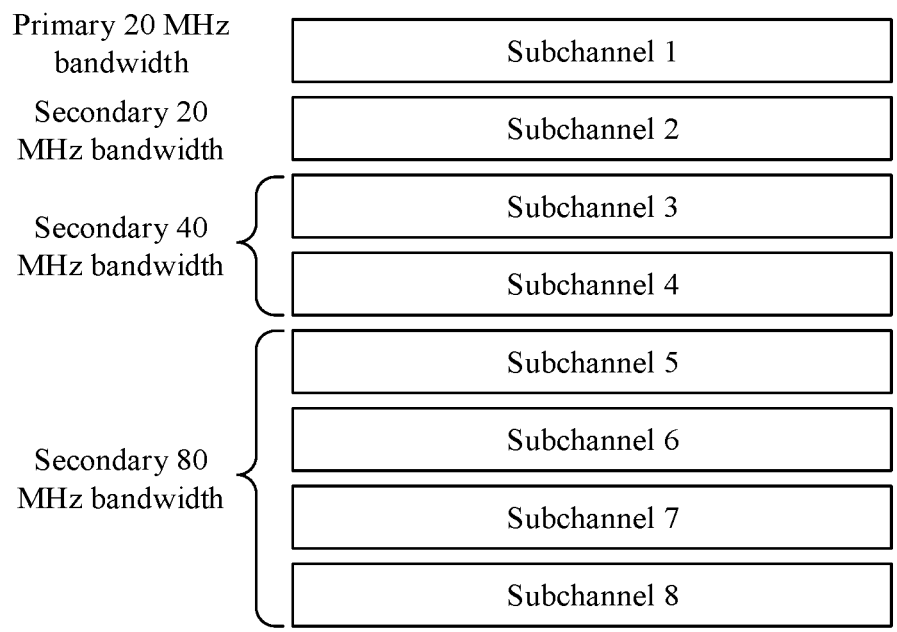
FIG. 1 is a schematic diagram of channel division when a bandwidth is 160 MHz according to an embodiment of this application.

In the specification, the claims, and the accompanying drawings of this application, the terms "first", "second", "third", "fourth", and the like are intended to distinguish between different objects but do not indicate a particular order. In addition, the terms "including", "having", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to embodiments may be included in at least one embodiment of this application. The phrase appear at various locations in this specification may neither necessarily mean a same embodiment, nor mean an independent or optional embodiment exclusive from another embodiment. A person skilled in the art understands, in explicit and implicit manners, that an embodiment described in this application may be combined with another embodiment.

In this application, "at least one (item)" means one or more, "a plurality of" means two or more, and "at least two (items)" means two or more than three (including three). The term "and/or" is used to describe an association relationship for describing associated objects and represents that three relationships may exist. For example, "A and/or B" may represent the following three cases: Only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The following describes embodiments of this application with reference to the accompanying drawings.

First, a network architecture in embodiments of this application is described.

A method provided in this application may be applied to various communication systems such as an Internet of Things (IoT) system, a narrowband Internet of Things (NB-IoT) system, a long-term evolution (LTE) system, a 5th generation (5G) communication system, and a new communication system (for example, 6G) emerging in future communication development. In addition, the method provided in this application may be further applied to a wireless local area network (WLAN) system, for example, wireless fidelity (Wi-Fi) and the like. The method provided in this application is further applicable to the following communication system.

Figure 2:
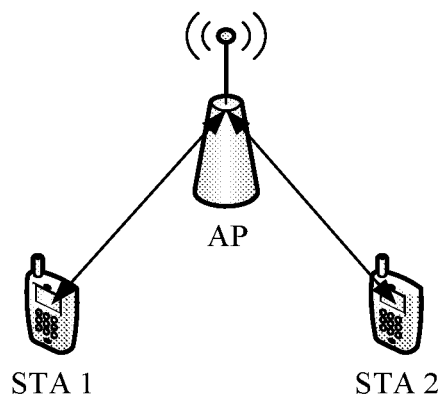
FIG. 2 is a schematic architectural diagram of a communication system according to an embodiment of this application.

The communication system includes an access point (AP) device and a station (STA) device. The access point device may also be understood as an access point entity, and the station device may also be understood as a station entity. For example, embodiments of this application may be applicable to a scenario of communication between an AP and an STA in a WLAN. Optionally, the AP may communicate with a single STA, or the AP may simultaneously communicate with a plurality of STAs. Specifically, communication between the AP and the plurality of STAs may be further divided into downlink transmission in which the AP simultaneously sends a signal to the plurality of STAs and uplink transmission in which the plurality of STAs send signals to the AP. For example, FIG. 2 is a schematic architectural diagram of a communication system according to an embodiment of this application. FIG. 2 shows one access point device and two station devices such as an STA 1 and an STA 2.

The AP may be an access point used by a terminal device such as a mobile phone to access a wired (or wireless) network, and is mainly deployed at home, in a building, and in a park. A typical coverage radius is from tens of meters to a hundred meters. Certainly, the access point may also be deployed outdoors. The AP is equivalent to a bridge that connects the wired network and a wireless network. The AP is mainly used to connect wireless network clients to each other, and then connect the wireless network to the Ethernet. Specifically, the AP may be a terminal device (for example, a mobile phone) or a network device (for example, a router) with a wireless fidelity (Wi-Fi) chip. The AP may be a device that supports an 802.11be standard or a next-generation standard. The AP may also be compatible with a plurality of wireless local area network (WLAN) standards such as 802.11ax, 802.11ac, 802.11n, 802.11g, 802.11b, and 802.11a. The STA may be a wireless communication chip, a wireless sensor, or a wireless communication terminal. For example, the STA may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the STA may be a device that supports an 802.11be standard or a next-generation standard. The STA may also be compatible with a plurality of wireless local area network (WLAN) standards such as 802.11ax, 802.11ac, 802.11n, 802.11g, 802.11b, and 802.11a.

In this embodiment of this application, a transmit device may be an access point device or a station device, and a receive device may also be an access point device or a station device. For example, the transmit device may be an access point device, and the receive device may also be an access point device. For another example, the transmit device is a station device, and the receive device may also be a station device. For another example, the transmit device is an access point device, and the receive device is a station device. For another example, the transmit device is a station device, and the receive device is an access point device.

It may be understood that in this embodiment of this application, an example in which the transmit device sends a PPDU to the receive device is used to describe a puncturing information indication method provided in this embodiment of this application, and the method may be applicable to various types of PPDUs. For example, the PPDU may include a multi-user physical protocol data unit (multiple user PHY protocol data unit, MU PPDU), a single-user physical protocol data unit (single user PHY protocol data unit, SU PPDU), a trigger-based physical protocol data unit (trigger based PHY protocol data unit, TB PPDU), or the like.

When the transmit device sends preamble puncturing information to the receive device, as shown in FIG. 1, the transmit device may use a channel of the PPDU to carry the preamble puncturing information, for example, send the preamble puncturing information on a subchannel 1 to a subchannel 8.

In the foregoing method for sending preamble puncturing information on all subchannels, resources are wasted, and signaling overheads are high. Therefore, this embodiment of this application provides the puncturing information indication method, to reduce the signaling overheads and avoid a waste of the resources.

Figures 3, 4:
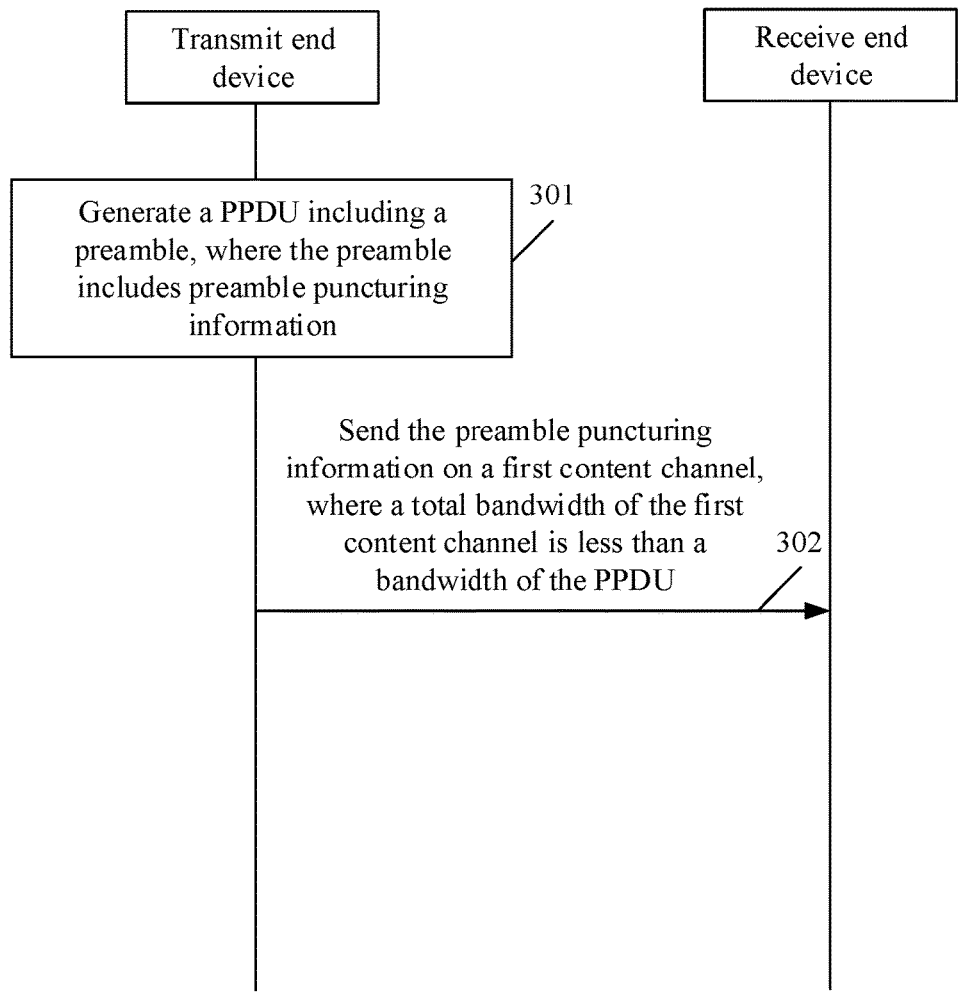
FIG. 3 is a schematic flowchart of a puncturing information indication method according to an embodiment of this application.
FIG. 4 is a schematic diagram of formats of some fields of an MU PPDU according to an embodiment of this application.

FIG. 3 is a schematic flowchart of a puncturing information indication method according to an embodiment of this application. As shown in FIG. 3, the method includes the following steps.

301: A transmit end device generates a PPDU including a preamble, where the preamble includes preamble puncturing information.

302: The transmit end device sends the preamble puncturing information on a first content channel, where a total bandwidth of the first content channel is less than a bandwidth of the PPDU.

Correspondingly, a receive end device receives the preamble puncturing information on the first content channel. The receive end device determines a usage status of a channel of the PPDU based on the preamble puncturing information.

According to the technical solution provided in this application, the preamble puncturing information is sent on the first content channel, and the total bandwidth of the first content channel is less than the bandwidth of the PPDU. In other words, the transmit end device reuses some subchannels of the PPDU to send the preamble puncturing information. Compared with a manner in which the preamble puncturing information is sent on all subchannels of the PPDU under indication by specially using one field, this method can reduce signaling overheads.

First, to better describe the first content channel in step 302 and the preamble puncturing information in step 301, the following describes a format of the PPDU in detail.

FIG. 4 is a schematic diagram of formats of some fields of an MU PPDU according to an embodiment of this application. As shown in FIG. 4, in 802.11ax, the MU PPDU may include a legacy short training field (L-STF), a legacy long training field (L-LTF), a legacy signal field (L-SIG), a repeated legacy signal field (RL-SIG), a high efficiency signal field A (HE-SIG-A), and a high efficiency signal field B (HE-SIG-B).

FIG. 5 is a schematic diagram of formats of some fields of a PPDU according to an embodiment of this application. As shown in FIG. 5, the PPDU in 802.11be not only includes an L-STF, an L-LTF, an L-SIG, and an RL-SIG, but also may include a universal (universal-SIG, U-SIG) field. The universal field may include two symbols. It may be understood that the PPDU shown in FIG. 5 may include an MU PPDU, and may further include an SU PPDU and the like.

In a possible implementation, preamble puncturing information is located in the universal signaling field; or the preamble puncturing information is located in a field after the universal signaling field. For example, as shown in FIG. 5, the field after the universal field may include an extremely high throughput signaling field (EHT-SIG). It may be understood that the preamble puncturing information is located in the universal signaling field, and may also be referred to as that the preamble puncturing information is carried in the universal signaling field. The two types of description are not limited in this embodiment of this application.

In a possible implementation, location indication information described below is located in the universal signaling field. It may be understood that when both of the location indication information and the preamble puncturing information are located in the universal signaling field, the location indication information may be located in a first symbol of the universal signaling field, and the preamble puncturing information may be located in a second symbol of the universal signaling field.

For example, when the location indication information is located in the first symbol of the universal signaling field, and a quantity of bits of the location indication information is 4 bits, a format of the first symbol of the universal field is shown in FIG. 6a and FIG. 6b, and a format of the second symbol of the universal field is shown in FIG. 7a and FIG. 7b. Optionally, as shown in FIG. 6a, the first symbol of the universal field may include a physical layer protocol data unit version (PPDU version) subfield, a basic service set color (BSS color) subfield, a location indication information subfield (indication subfield), a reserved subfield, a cyclic redundancy code (CRC) subfield, and a tail bit subfield. Optionally, as shown in FIG. 6b, the first symbol of the universal field may include a physical layer protocol data unit version (PPDU version) subfield, a basic service set color (BSS color) subfield, a PPDU format subfield, a transmit opportunity (TXOP) subfield, a location indication information subfield, and a reserved subfield.

Optionally, as shown in FIG. 7a, the second symbol of the universal field may include a physical layer protocol data unit format subfield, a transmit opportunity (TXOP) subfield, an uplink/downlink (UL/DL) subfield, a reserved subfield, a CRC subfield, and a tail bit subfield. Optionally, as shown in FIG. 7b, the second symbol of the universal field may include an uplink/downlink (UL/DL) subfield, a reserved subfield, a CRC subfield, and a tail bit subfield.

It may be understood that, in addition to the fields shown in FIG. 6a, FIG. 6b, FIG. 7a, and FIG. 7b, the universal field may further include a spatial reuse subfield, a guard interval+long training sequence (guard interval+long training field, GI+LTF) subfield, a Doppler subfield, a space-time block coding (STBC) subfield, a pre-fec padding factor subfield, a packet extension disambiguity (PE disambiguity) subfield, and the like. It may be understood that specific locations of the fields shown in FIG. 6a, FIG. 6b, FIG. 7a, and FIG. 7b are not limited in this embodiment of this application.

As shown in FIG. 8, for brevity of description, fields following the universal field are successively replaced with a SIG1, a SIG2, a SIG3, and the like in the following.

The first content channel in step 302 is described in detail in the following.

In this embodiment of this application, content carried on the first content channel is the preamble puncturing information, and the first content channel is distributed on some channels of the PPDU. The first content channel may be distributed on some consecutive subchannels of the PPDU, or the first content channel may be distributed on some inconsecutive subchannels of the PPDU. For example, a bandwidth of the PPDU is 320 MHz, and the first content channel may be distributed on some channels of a channel 1 to a channel 16. That is, the total bandwidth of the first content channel is less than 320 MHz.

Further, in this embodiment of this application, different content channels are distinguished in a field after the U-SIG field. For example, the first content channel and a second content channel are distinguished in the SIG1 field. The preamble puncturing information may be located in a field after the U-SIG field. For example, the preamble puncturing information may be located in an $N^{th}$ field (SIGN field) after the U-SIG field, where N is greater than or equal to 1. For example, N=1, N=2, or N=3. For another example, the preamble puncturing information may be located in a field after the U-SIG field, and the first content channel includes one or more subchannels. For example, the preamble puncturing information may be located in M consecutive different fields after the U-SIG field, where M is greater than or equal to 1. For example, M=1, M=2, or M=3. For example, the preamble puncturing information may be located in the EHT-SIG field after the U-SIG field, and the first content channel may include subchannels corresponding to an ID 14 to an ID 16. It may be understood that M and N shown above may be preset, or may be indicated by the location indication information. It may be understood that description of the preamble puncturing information is applicable to all the following embodiments.

Figure 9:
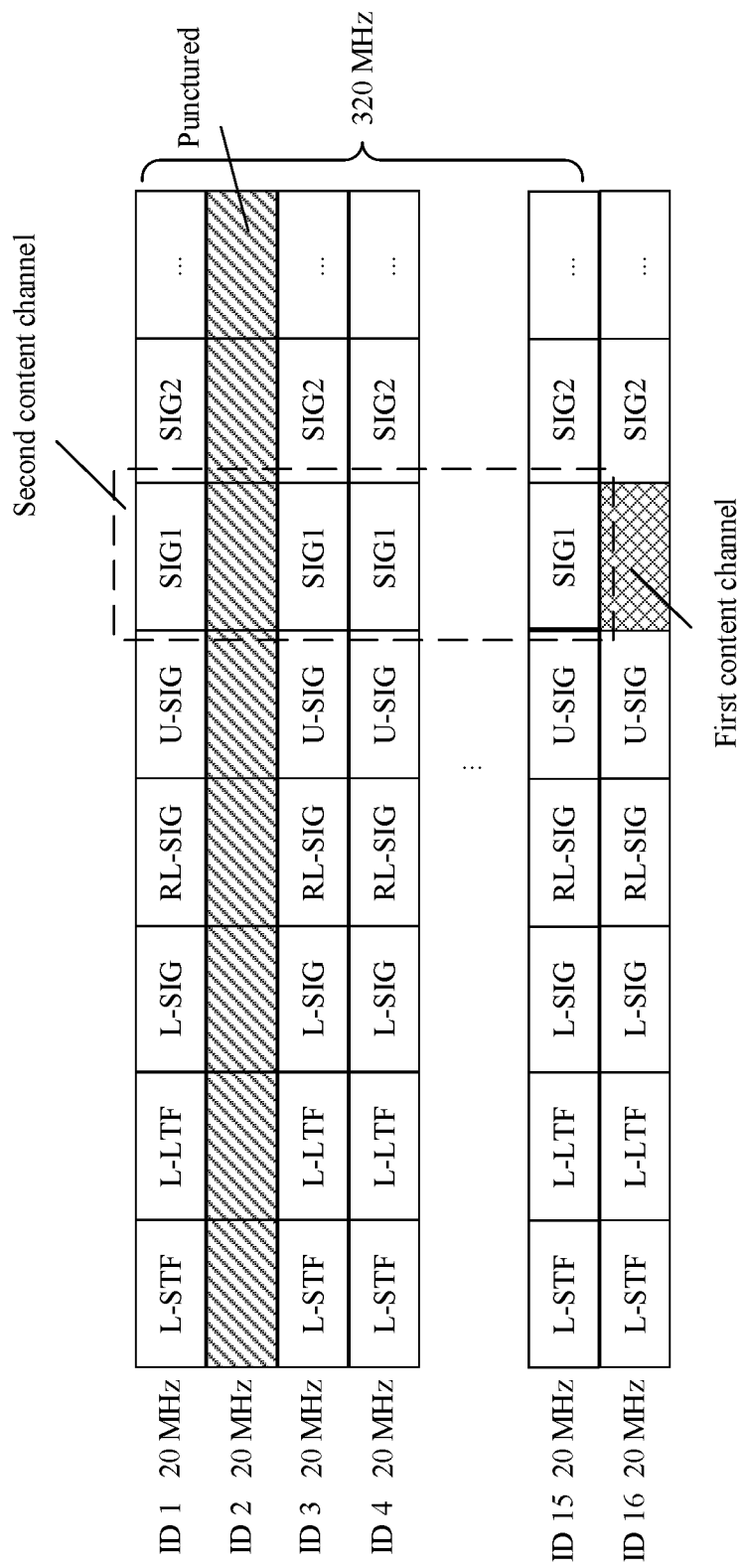
FIG. 9 is a schematic diagram of a location of a first content channel according to an embodiment of this application.

For example, as shown in FIG. 9, the first content channel is a part in which the SIG1 field is located on the subchannel corresponding to the ID 16. In other words, the preamble puncturing information being sent on the first content channel may be understood as the preamble puncturing information being located in the SIG1 field on the subchannel corresponding to the ID 16.

In a possible implementation, the first content channel may include a preset subchannel. The first content channel may include a preset odd-numbered subchannel, the first content channel may include a preset even-numbered subchannel, or the first content channel may include a preset specified subchannel. A bandwidth of the subchannel is a fixed value. For example, the fixed value includes 20 MHz. Alternatively, the fixed value may include a bandwidth value at another granularity. A specific value of the fixed value is not limited in this embodiment of this application. It may be understood that preset odd-numbered subchannels may be all odd-numbered subchannels, or may be some odd-numbered subchannels. Similarly, preset even-numbered subchannels may be all even-numbered subchannels, or may be some even-numbered subchannels. It may be understood that the preset subchannel may be preset by a protocol, may be set by a device manufacturer, or the like.

As shown in FIG. 9, an example in which the bandwidth of the PPDU is 320 MHz and the bandwidth of the subchannel is 20 MHz is used. The odd-numbered subchannel is a subchannel corresponding to an identifier (ID) index that is an odd number in FIG. 9, and the even-numbered subchannel is a subchannel corresponding to an ID that is an even number in FIG. 9. For example, the first content channel may include the subchannel corresponding to the ID 16, and subchannels corresponding to an ID 1 to the ID 15 may be understood as the second content channel. In this case, the second content channel is used to carry other information.

In the technical solution of this application, the first content channel is preset, and no dedicated information needs to indicate a frequency domain location of the first content channel. This further reduces signaling overheads.

Figure 10:
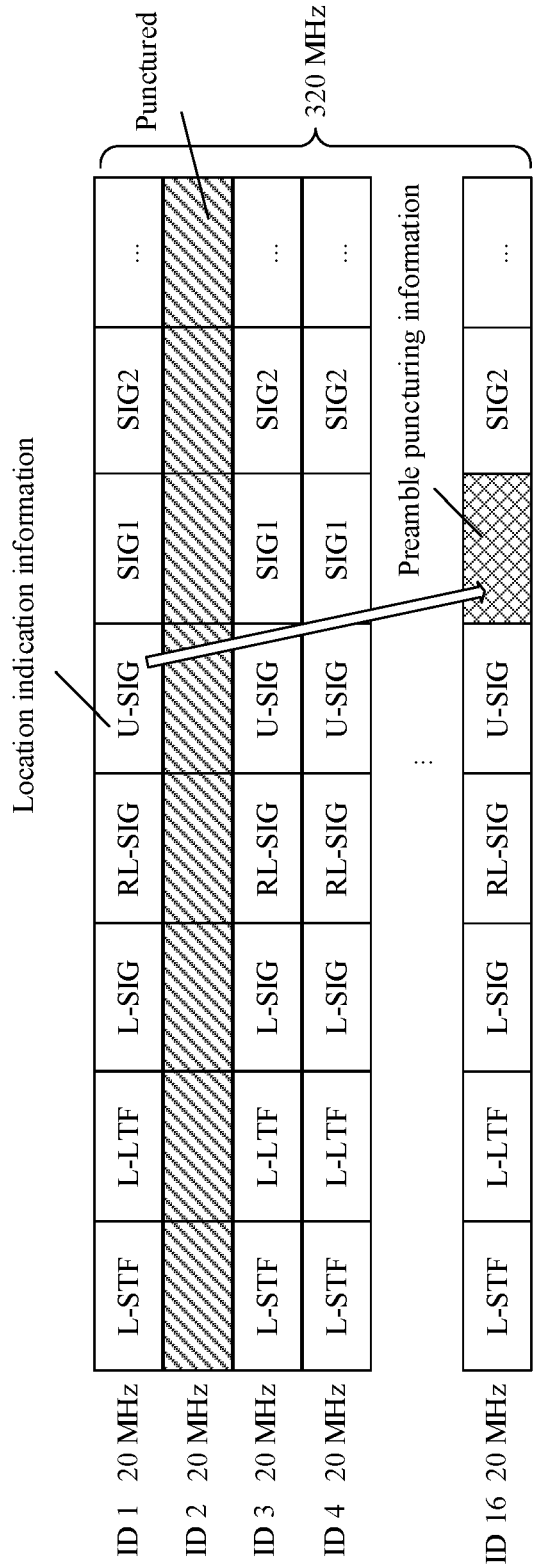
FIG. 10 is a schematic diagram of distribution of preamble puncturing information and location indication information according to an embodiment of this application.

In a possible implementation, the transmit device may indicate, by using the location indication information, the frequency domain location of the first content channel. As shown in FIG. 10, the transmit device may indicate the frequency domain location of the first content channel by using the location indication information, so that the receive device receives the preamble puncturing information on the first content channel.

The location indication information is separately described as follows.

Solution 1

The location indication information may indicate that the first content channel includes the odd-numbered subchannel or the even-numbered subchannel. The quantity of bits of the location indication information is 1 bit, as shown in Table 1 and Table 2.

TABLE 1

| Value | Definition |
|---|---|
| 0 | First content channel includes the odd-numbered subchannel |
| 1 | First content channel includes the even-numbered subchannel |

TABLE 2

| Value | Definition |
|---|---|
| 1 | First content channel includes the odd-numbered subchannel |
| 0 | First content channel includes the even-numbered subchannel |

It may be understood that, when the 1-bit location indication information indicates the frequency domain location of the first content channel, the first content channel may include all the odd-numbered subchannels or all the even-numbered subchannels.

Solution 2

The location indication information may indicate any one of the following: The first content channel includes the odd-numbered subchannel, the first content channel includes the even-numbered subchannel, or the first content channel includes the specified subchannel.

For Solution 2, the quantity of bits of the location indication information may be 2 bits, 3 bits, 4 bits, or 6 bits.

It may be understood that, in the following different scenarios, the quantity of bits of the location indication information is related to the bandwidth of the PPDU and the bandwidth of the subchannel. For example, a larger bandwidth of the PPDU indicates a larger quantity of bits of the location indication information, and a larger bandwidth of the subchannel indicates a smaller quantity of bits of the location indication information. To better describe a specific indication manner of the location indication information, the following separately provides description by using an example in which the bandwidth of the PPDU is 320 MHz and the bandwidth of the subchannel is 20 MHz.

Scenario 1: The quantity of bits of the location indication information is 2 bits.

In this case, the location indication information may indicate any one of the following: The first content channel includes all the odd-numbered subchannels, the first content channel includes all the even-numbered subchannels, or the first content channel includes the specified subchannel. In addition, the specified subchannel is preset. For example, if the location indication information is 00, it indicates that the first content channel includes all the odd-numbered subchannels; if the location indication information is 01, it indicates that the first content channel includes all the even-numbered subchannels; and if the location indication information is 10, it indicates that the first content channel includes the specified subchannel. For another example, if the location indication information is 01, it indicates that the first content channel includes all the odd-numbered subchannels; if the location indication information is 10, it indicates that the first content channel includes all the even-numbered subchannels; and if the location indication information is 11, it indicates that the first content channel includes the specified subchannel.

Scenario 2: The quantity of bits of the location indication information is 3 bits.

In this case, the location indication information may indicate that the first content channel includes the odd-numbered subchannel or the even-numbered subchannel. Specifically, the location indication information may indicate any one of the odd-numbered subchannels or any subchannel of the even-numbered subchannels. For example, the first content channel includes any one of odd-numbered subchannels ID 3/ID 5/ID 7/ID 9/ID 11/ID 13/ID 15. For example, if the location indication information is 001, it indicates that the first content channel includes the subchannel corresponding to the ID 3; if the location indication information is 010, it indicates that the first content channel includes the subchannel corresponding to the ID 5; or if the location indication information is 111, it indicates that the first content channel includes the subchannel corresponding to the ID 15. For another example, the first content channel includes any one of even-numbered subchannels ID 2/ID 4/ID 6/ID 8/ID 10/ID 12/ID 14/ID 16. If the location indication information is 000, it indicates that the first content channel includes the subchannel corresponding to the ID 2; or if the location indication information is 111, it indicates that the first content channel includes the subchannel corresponding to the ID 16.

Scenario 3: The quantity of bits of the location indication information is 4 bits.

In this case, the location indication information may indicate any one of subchannels corresponding to the ID 1 to the ID 16.

For example, if the location indication information is 0001, it indicates that the first content channel includes the subchannel corresponding to the ID 2; or if the location indication information is 1111, it indicates that the first content channel includes the subchannel corresponding to the ID 16.

Scenario 4: The quantity of bits of the location indication information is 6 bits.

In this case, the location indication information not only may indicate the frequency domain location of the first content channel, but also may indicate mode information corresponding to the frequency domain location. The mode information corresponding to the frequency domain location may be understood as location classification information of the first content channel. The location indication information includes the mode indication information and corresponding indication information. The mode indication information indicates different modes, and the corresponding indication information indicates a specific frequency domain location in a mode indicated by the mode indication information. Optionally, the mode information may include three modes. For example, a first mode may be that the first content channel includes the odd-numbered subchannel, a second mode may be that the first content channel includes the even-numbered subchannel, and a third mode may be that the first content channel includes the specified subchannel.

For example, as shown in FIG. 11, a quantity of bits of the mode indication information is 2 bits, and a quantity of bits of the corresponding indication information is 4 bits. For example, if the mode indication information is 00, the corresponding indication information may indicate any one of the subchannels corresponding to the ID 1 to the ID 16. For another example, if the mode indication information is 01, the corresponding indication information may indicate any one of the odd-numbered subchannels. For another example, if the mode indication information is 10, the corresponding indication information may indicate any one of the even-numbered subchannels. For another example, if the mode indication information is 11, the corresponding indication information may indicate a value in a mapping set, and the mapping set includes a correspondence between the frequency domain location of the first content channel and the value.

When the mode indication information is 11, optionally, as shown in Table 3, when a decimal value corresponding to a value of the corresponding indication information is 0, it may indicate that the bandwidth of the PPDU is 20 MHz. When the decimal value corresponding to the value of the corresponding indication information is 1, it may indicate that the frequency domain location of the first content channel is on a subchannel corresponding to a secondary 20 MHz bandwidth, and the bandwidth of the PPDU is 40 MHz. When the decimal value corresponding to the value of the corresponding indication information is 3, it may indicate that the frequency domain location of the first content channel is on a second subchannel corresponding to a secondary 40 MHz bandwidth, and the bandwidth of the PPDU is 80 MHz. R20 may also be understood as 20_2, that is, on the second subchannel corresponding to the 40 MHz bandwidth. When the decimal value corresponding to the value of the corresponding indication information is 6, it may indicate that the frequency domain location of the first content channel is on a subchannel corresponding to a second 20 MHz bandwidth corresponding to a secondary 80 MHz bandwidth.

It may be understood that, in Table 3, when an index is 1, the preamble puncturing information may not be included, or information sent on the subchannel corresponding to the secondary 20 MHz bandwidth may be the same as information (for example, completely duplicated) sent on a subchannel corresponding to a primary 20 MHz bandwidth (primary 20 MHz).

TABLE 3

| Index | Definition | Bandwidth |
| --- | --- | --- |
| 0 | — | 20 MHz |
| 1 | 2 (S20) | 40 MHz |
| 2 | 2 (S20) | 80 MHz |
| 3 | 4 (S40-R20) | 80 MHz |
| 4 | 2 (S20) | 160 MHZ |
| 5 | 4 (S40-R20) | 160 MHz |
| 6 | 6 (S80-20_2) | 160 MHz |
| 7 | 8 (S80-20_4) | 160 MHz |
| 8 | 2 (S20) | 320 MHz |
| 9 | 4 (S40-R20) | 320 MHz |
| 10 | 6 (S80-20_2) | 320 MHz |
| 11 | 8 (S80-20_4) | 320 MHz |
| 12 | 10 (S160-20_2) | 320 MHz |
| 13 | 12 (S160-20_4) | 320 MHz |
| 14 | 14 (S160-20_6) | 320 MHz |
| 15 | 16 (S160-20_8) | 320 MHz |

Optionally, definitions of indexes 9 to 16 in Table 3 may be alternatively replaced with those in Table 4.

TABLE 4

| 8 | 2 (S20) | 240 MHz |
| --- | --- | --- |
| 9 | 4 (S40-R20) | 240 MHz |
| 10 | 6 (S80-20_2) | 240 MHz |
| 11 | 8 (S80-20_4) | 240 MHz |
| 12 | 2 (S20) | 320 MHz |
| 13 | 4 (S40-R20) | 320 MHz |
| 14 | 6 (S80-20_2) | 320 MHz |
| 15 | 8 (S80-20_4) | 320 MHz |

When the mode indication information is 11, optionally as shown in Table 5, in Table 5, "√" may indicate that a subchannel is not punctured, "×" may indicate that the subchannel is punctured, "-" indicates that there is no channel, and "?" indicates that a puncturing status of the subchannel is not concerned. For example, when the decimal value corresponding to the value of the corresponding indication information is 0, it indicates that the bandwidth of the PPDU is 20 MHz, and all subchannels of the PPDU are not punctured. When the decimal value corresponding to the value of the corresponding indication information is 4, it indicates that the bandwidth of the PPDU is 160 MHz, the subchannel corresponding to the secondary 20 MHz bandwidth is punctured, and whether the subchannel corresponding to the secondary 80 MHz bandwidth is punctured is not indicated.

TABLE 5

| Index (index) | Primary 80 MHz bandwidth | | | | Secondary 80 MHz bandwidth | | | | Bandwidth |
|---|---|---|---|---|---|---|---|---|---|
| 0 | √ | | | | — | | | | 20 MHz |
| 1 | √ | √ | | | — | | | | 40 MHz |
| 2 | √ | x | ? | √ | — | | | | 80 MHz |
| 3 | √ | √ | ? | ? | — | | | | 80 MHz |
| 4 | √ | x | ? | √ | ? | | | | 160 MHz |
| 5 | √ | √ | ? | ? | ? | | | | 160 MHz |
| 6 | √ | x | ? | √ | ? | ? | √ | √ | 160 MHz |
| 7 | √ | √ | ? | ? | ? | ? | √ | √ | 160 MHz |
| 8 | √ | x | ? | √ | ? | | | | 240 MHz |
| 9 | √ | √ | ? | ? | ? | | | | 240 MHz |
| 10 | √ | x | ? | √ | ? | ? | √ | √ | 320 MHz |
| 11 | √ | √ | ? | ? | ? | ? | √ | √ | 320 MHz |
| 12 | √ | x | ? | √ | √ | √ | ? | ? | 320 MHz |
| 13 | √ | √ | ? | ? | √ | √ | ? | ? | 320 MHz |
| 14 | √ | x | ? | √ | √ | ? | ? | √ | 320 MHz |
| 15 | √ | √ | ? | ? | √ | ? | ? | √ | 320 MHz |

It may be understood that a specific quantity of bits of the location indication information is not limited in this embodiment of this application. For example, the specific quantity of bits of the location indication information may be 8 bits or 7 bits. More bits indicate more modes.

Implementation of this embodiment of this application not only makes an indication manner of the location indication information in this application more flexible, but also maintains compatibility to some extent.

Optionally, in Scenario 2, Scenario 3, and Scenario 4, the location indication information may indicate the frequency domain location of the first content channel, and may further indicate a bandwidth value of the PPDU. Specifically, the first content channel includes a subchannel corresponding to a maximum secondary bandwidth in the bandwidth of the PPDU. For example, if the location indication information indicates that the first content channel is on a subchannel (the ID 3 and/or the ID 4) corresponding to the secondary 40 MHz bandwidth, the bandwidth of the PPDU is 80 MHz. For another example, if the first content channel indicated by the location indication information is on subchannels (namely, the subchannels corresponding to the ID 5 to the ID 8) corresponding to the secondary 80 MHz bandwidth, the bandwidth of the PPDU is 160 MHz. For another example, if the first content channel indicated by the location indication information is on subchannels (the subchannels corresponding to the ID 9 to the ID 16) corresponding to a secondary 160 MHz bandwidth, the bandwidth of the PPDU is 320 MHz.

Optionally, the bandwidth of the PPDU may alternatively be 240 MHz. Therefore, to distinguish whether the bandwidth of the PPDU is 240 MHz or 160 MHz, in this embodiment of this application, a maximum secondary bandwidth of the 160 MHz bandwidth is defined as an 80 MHz bandwidth, and a maximum secondary bandwidth of the 240 MHz bandwidth is defined as a third 80 MHz bandwidth.

Optionally, if the first content channel includes a subchannel corresponding to a second secondary 80 MHz bandwidth, the bandwidth of the PPDU is 160 MHz. If the first content channel includes a subchannel corresponding to the third secondary 80 MHz bandwidth, the bandwidth of the PPDU is 240 MHz. A first secondary 80 MHz bandwidth may be understood as a first 80 MHz bandwidth on which the primary 20 MHz bandwidth is located.

Optionally, in addition to the manners in which the bandwidth of the PPDU is indicated above, the bandwidth of the PPDU may be indicated by adding a bandwidth subfield to the universal signaling field. For example, the reserved subfield in FIG. 6a is replaced with the bandwidth subfield. For another example, the quantity of bits of the location indication information may be 3 bits, the reserved subfield in FIG. 6a is replaced with the bandwidth subfield, and a quantity of bits of the bandwidth subfield is 3 bits. The bandwidth subfield may indicate that the bandwidth of the PPDU is any one of the following: 20 MHz, 40 MHz, 80 MHz, 160 MHz, 240 MHz, or 320 MHz. The bandwidth subfield is added to the universal signaling field, so that the receive device can learn the bandwidth of the PPDU in advance. This facilitates configuring of a frequency band resource by the receive device.

It may be understood that the first content channel may further include a subchannel with a good channel condition. For example, the transmit device may select a subchannel with a good channel condition from subchannels corresponding to a maximum secondary bandwidth, to send the preamble puncturing information.

In this embodiment of this application, the frequency domain location of the first content channel is indicated by adding a few bits to the location indication information. Therefore, the receive device can receive the preamble puncturing information on the first content channel.

Figure 12:
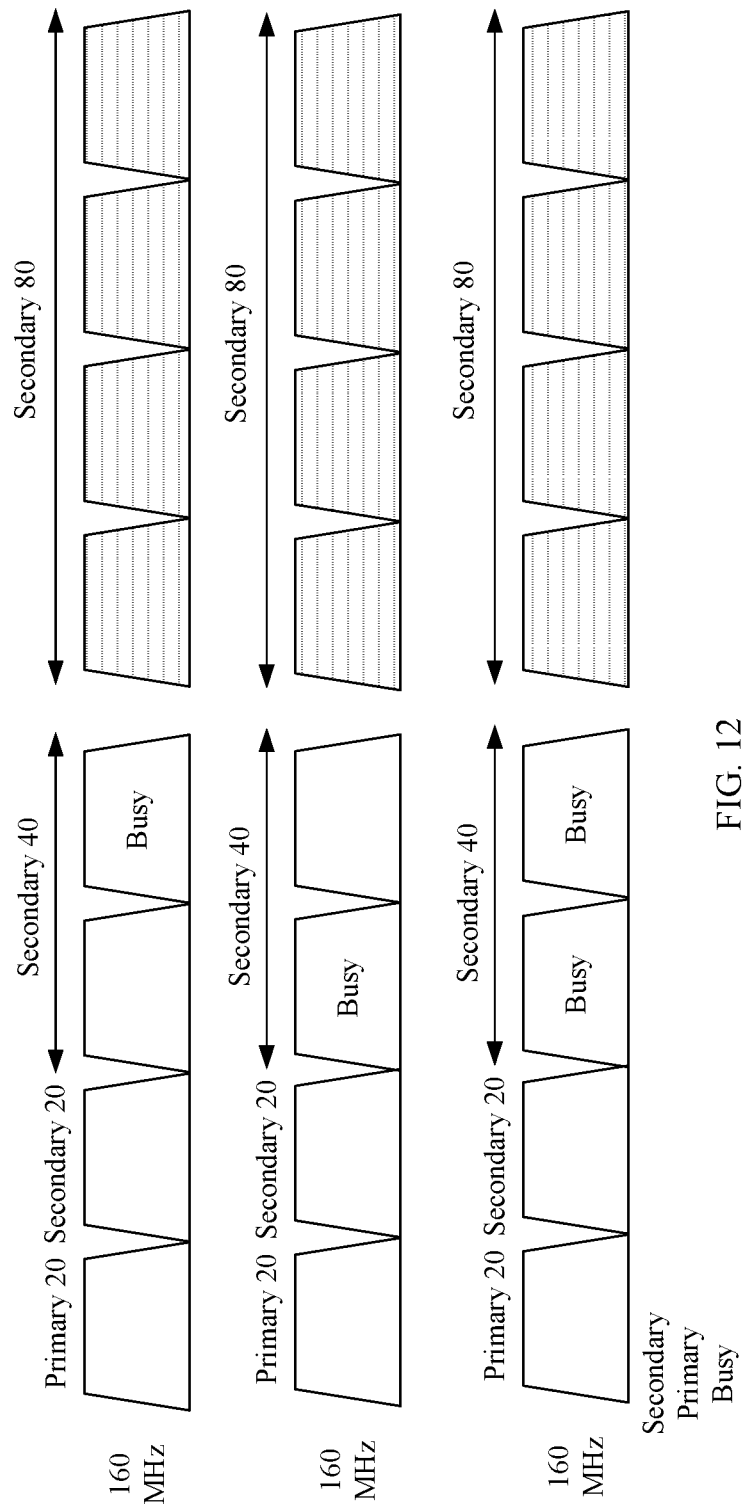
FIG. 12 is a schematic diagram of preamble puncturing information when a preamble puncturing mode is 7 according to an embodiment of this application.

FIG. 12 is a schematic diagram of preamble puncturing information when a preamble puncturing mode in an MU PPDU is 7. When the preamble puncturing mode is 7, it may indicate that the bandwidth of the PPDU is 160/80 MHz +80 MHz. A channel puncturing manner is that any subchannel or all subchannels corresponding to the secondary 40 MHz (S40) bandwidth are punctured.

In the foregoing solution, the indication manner of the preamble puncturing information is inflexible. For example, the transmit device cannot indicate, to the receive device, a puncturing status of a subchannel corresponding to the secondary 80 MHz bandwidth; or the transmit device cannot indicate, to the receive device, both of a puncturing status of a subchannel corresponding to the secondary 40 MHz bandwidth and a puncturing status of a subchannel corresponding to the secondary 80 MHz bandwidth.

Therefore, this embodiment of this application further provides preamble puncturing information that can more flexibly indicate a puncturing status of a channel.

In this embodiment of this application, a field in which the preamble puncturing information is located is, for example, referred to as a first field, and a time-frequency resource used by the U-SIG is reused by the first field; or a time-frequency resource used by the SIGn is reused by the first field, where n is a positive integer, for example, n=1, 2, 3, or 4. In the following, a field in which the preamble puncturing information is located is referred to as the first field.

In a possible implementation, the preamble puncturing information may include a bitmap indicating whether a subchannel is punctured. In a bitmap indication manner, statuses indicating whether all subchannels are occupied may be exhaustively described, and the puncturing status of the channel is more flexibly indicated. For example, when the bandwidth of the PPDU is 320 MHz and the bandwidth of the subchannel is 20 MHz, a quantity of bits of the preamble puncturing information may be 16 bits. For example, "1" indicates that the subchannel is punctured, and "0" indicates that the subchannel is not punctured. For example, if the preamble puncturing information is 0000 0000 0001 1110, the receive device receives the preamble puncturing information, and may determine that the subchannels corresponding to the ID 2 to the ID 5 are punctured. Optionally, "0" may indicate that the subchannel is punctured, and "1" may indicate that the subchannel is not punctured.

Optionally, the quantity of bits of the preamble puncturing information may alternatively be 14 bits, and the 14 bits may indicate a puncturing status of a subchannel other than the subchannel corresponding to the ID 1 and the sub channel occupied by the preamble puncturing information. For example, if the subchannel occupied by the preamble puncturing information is the subchannel corresponding to the ID 16, the 14 bits may indicate puncturing statuses of the subchannels corresponding to the ID 2 to the ID 15.

It may be understood that when the bandwidth of the PPDU is 40 MHz, the transmit device does not need to send the preamble puncturing information, and does not need to send the location indication information either.

It may be understood that, in addition to indicating the puncturing statuses of the subchannels in a sequence of numbers of the subchannels, the preamble puncturing information may indicate the puncturing statuses of the subchannels in another agreed sequencing manner. If the subchannels corresponding to the ID 2 to the ID 5 are punctured, the preamble puncturing information may alternatively be 0111 1000 0000 0000.

Figure 13:
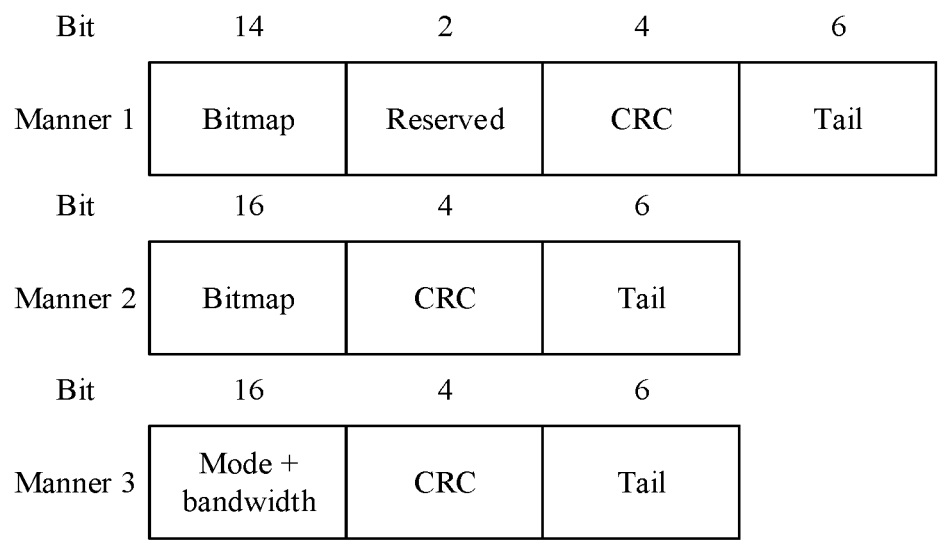
FIG. 13 is a schematic diagram of a format of a first field according to an embodiment of this application.

FIG. 13 is a schematic diagram of a format of a first field according to an embodiment of this application. The field may include 14 bits or 16 bits of preamble puncturing information. Optionally, the field may further include a reserved subfield, a CRC subfield, and a tail bit subfield. Optionally, the field may further include a CRC subfield and a tail bit subfield. It may be understood that, in addition to the preamble puncturing information, information carried in the first field shown in FIG. 13 may further include other information, for example, resource unit combination information.

It may be understood that preamble puncturing information is indicated in a manner shown in FIG. 13, and the preamble puncturing information may further indicate a bandwidth of a PPDU. For example, a puncturing status of a subchannel is indicated by using 1111 1111 1111 1000. When receiving the preamble puncturing information, a receive device may further learn that the bandwidth of the PPDU is 320 MHz.

It may be understood that the preamble puncturing information shown above is shown by using a bandwidth granularity of 20 MHz as an example. In a specific implementation, a bandwidth granularity of 10 MHz, 40 MHz, 80 MHz, or the like may alternatively be used. Correspondingly, a bandwidth of the subchannel may alternatively be 10 MHz, 40 MHz, or the like.

In a possible implementation, the preamble puncturing information may be indicated in a mode +bandwidth indication manner. As shown in FIG. 13, in the mode+bandwidth manner, the preamble puncturing information may indicate different bandwidths, or may indicate a preamble puncturing mode.

As an example, when the preamble puncturing information is 0000 0000 0000 0000 (0 in decimal notation), it may indicate that the bandwidth of the PPDU is 20 MHz.

When the preamble puncturing information is 0000 0000 0000 0010 (1 in decimal notation), it may indicate that the bandwidth of the PPDU is 40 MHz.

When the preamble puncturing information is from 0000 0000 0000 0011 to 0000 0000 0000 0100, it may indicate that the bandwidth of the PPDU is 80 MHz and indicate a preamble puncturing status of a subchannel corresponding to the 80 MHz bandwidth. It may be understood that, in this case, there may be six corresponding indexes, that is, corresponding to 3 to 8 in decimal notation. The preamble puncturing information does not include a case in which a subchannel corresponding to a primary 20 MHz bandwidth is punctured. In addition, a case in which two subchannels corresponding to a secondary 40 MHz bandwidth are punctured is not included.

The rest may be deduced by analogy. The preamble puncturing information may indicate that a bandwidth is 160 MHz and indicate puncturing statuses of eight subchannels corresponding to a first 80 MHz bandwidth and a second 80 MHz bandwidth. In this case, the preamble puncturing information may include 125 (2*2*2*2*2*2*2−3) index values. Optionally, when the bandwidth of the PPDU is 160 MHz, the preamble puncturing information may alternatively include only a puncturing status of a subchannel corresponding to the first 80 MHz bandwidth.

Further, the preamble puncturing information may further indicate that the bandwidth of the PPDU is 240 MHz and indicate the puncturing status of the subchannel corresponding to the first 80 MHz bandwidth.

Further, the preamble puncturing information may further indicate that the bandwidth of the PPDU is 320 MHz, and indicate the puncturing status of the subchannel corresponding to the first 80 MHz bandwidth. Optionally, the preamble puncturing information may further indicate that the bandwidth of the PPDU is 320 MHz, and indicate puncturing statuses of subchannels corresponding to the first 80 MHz bandwidth and the second 80 MHz bandwidth. Optionally, the preamble puncturing information may further indicate that the bandwidth of the PPDU is 320 MHz, and indicate puncturing statuses of subchannels corresponding to the first 80 MHz bandwidth and a third 80 MHz bandwidth. Optionally, the preamble puncturing information may further indicate that the bandwidth of the PPDU is 320 MHz, and indicate puncturing statuses of subchannels corresponding to the first 80 MHz bandwidth and a fourth 80 MHz bandwidth.

In addition to the manner shown in FIG. 13, there may be another indication manner of the preamble puncturing information. For example, a 14-bit preamble puncturing indication may be compressed for robustness or carrying other information. For example, an indication granularity is 80 MHz on some bandwidths. For example, an 80 MHz bandwidth in which a primary 20 MHz bandwidth is located is indicated based on a granularity of a 20 MHz bandwidth, and following three 80 MHz bandwidths are indicated based on granularities of three 80 MHz bandwidths. Three bits may indicate the three 80 MHz bandwidths.

If the preamble puncturing information is carried in a SIG1 field, a bit length of the SIG1 field is increased, and signaling overheads are increased. Compared with that the preamble puncturing information is carried in the SIG field, in the technical solution of this application, not only a puncturing status of a subchannel can be more flexibly indicated, but also the signaling overheads can be reduced by carrying 16-bit or 14-bit preamble puncturing information in the first field.

It may be understood that the foregoing description of the first content channel and the preamble puncturing information is applicable to all the following embodiments.

Finally, a specific embodiment to which the embodiments of this application are applied is described below by using an example with reference to the preamble puncturing information and the first content channel. All the following embodiments and accompanying drawings are shown by using an example in which a bandwidth of a PPDU is 320 MHz and a bandwidth of a subchannel is 20 MHz.

Embodiment 1

Figure 14:
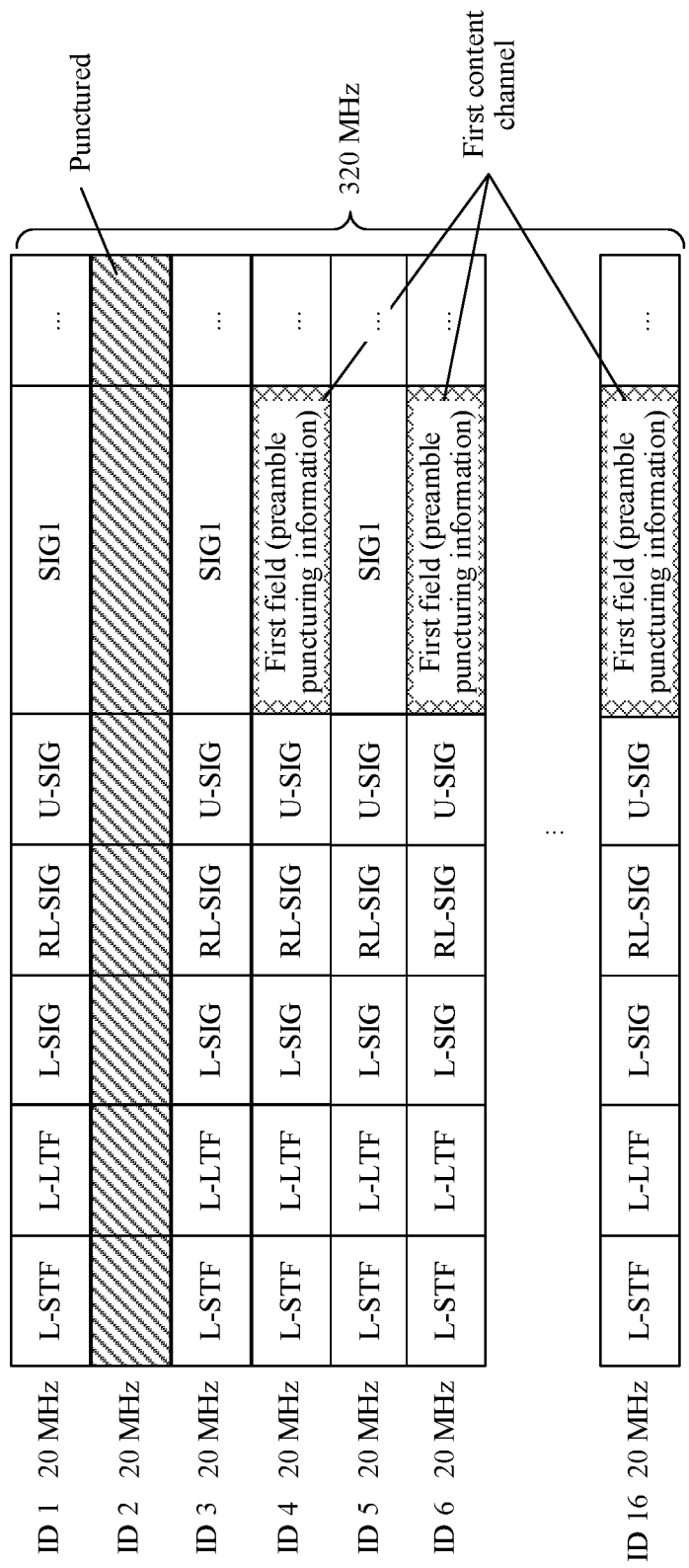
FIG. 14 is a schematic diagram of formats of some fields of an SU PPDU according to an embodiment of this application.

FIG. 14 is a schematic diagram of formats of some fields of an SU PPDU according to an embodiment of this application. A first content channel includes all even-numbered subchannels and does not include a punctured even-numbered subchannel. A first field in which preamble puncturing information is located may reuse a time-frequency resource used by a SIG1 field. As shown in FIG. 14, an even-numbered subchannel occupied by the first field may be used to send the preamble puncturing information. It may be understood that specific information content carried on an odd-numbered subchannel is not limited in this embodiment of this application.

Embodiment 2

Figure 15:
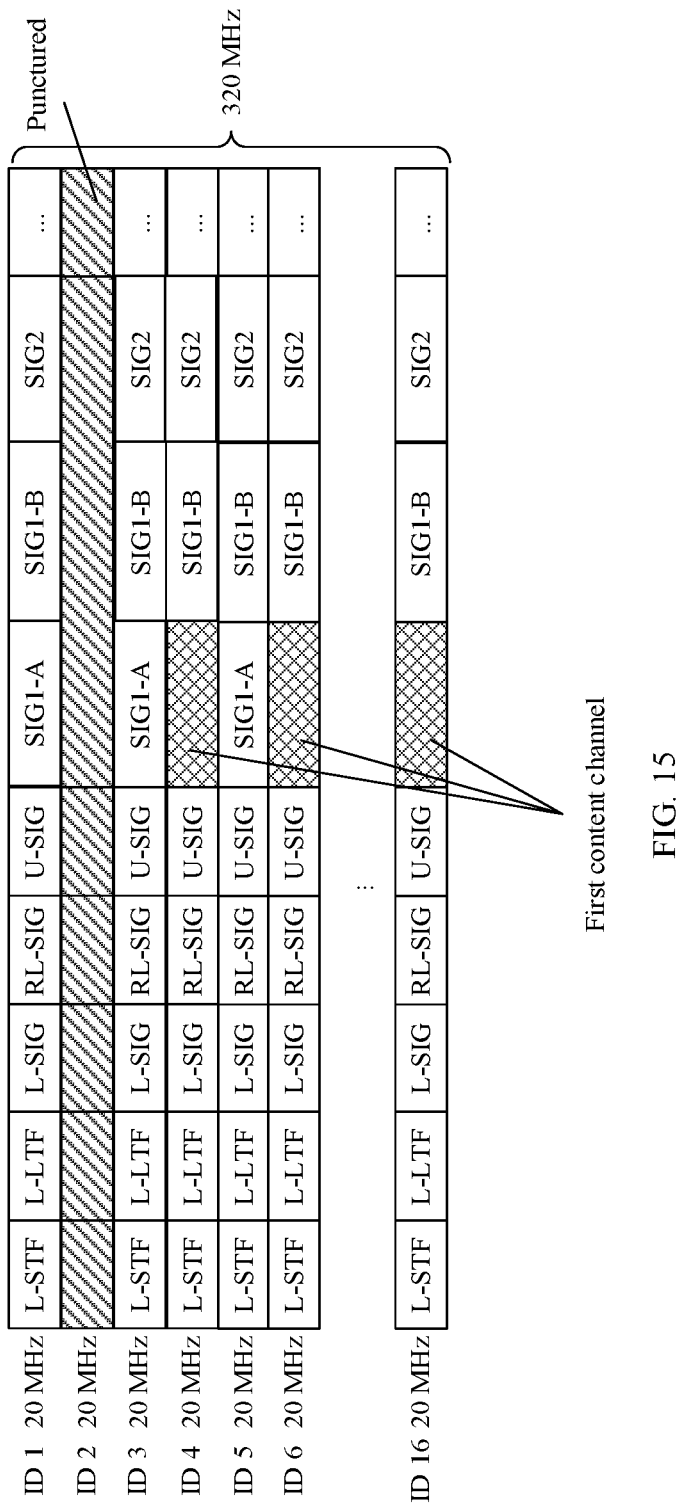
FIG. 15 is a schematic diagram of formats of some fields of an MU PPDU according to an embodiment of this application.

FIG. 15 is a schematic diagram of formats of some fields of an MU PPDU according to an embodiment of this application. As shown in FIG. 15, a SIG1 field of the MU PPDU includes a SIG1-A subfield and a SIG1-B subfield. A first content channel includes all even-numbered subchannels and does not include a punctured even-numbered subchannel. A first field in which preamble puncturing information is located may reuse a time-frequency resource originally used by the SIG1-A subfield. As shown in FIG. 15, an even-numbered subchannel occupied by the first field may be used to send the preamble puncturing information.

Optionally, the first field may include a CRC subfield and a tail bit subfield. Alternatively, the first field may not include the CRC subfield and the tail bit subfield.

It may be understood that a part or all of SIG1-A subfield may be reused by the first field. This is not limited in this embodiment of this application.

Embodiment 3

Figure 16:
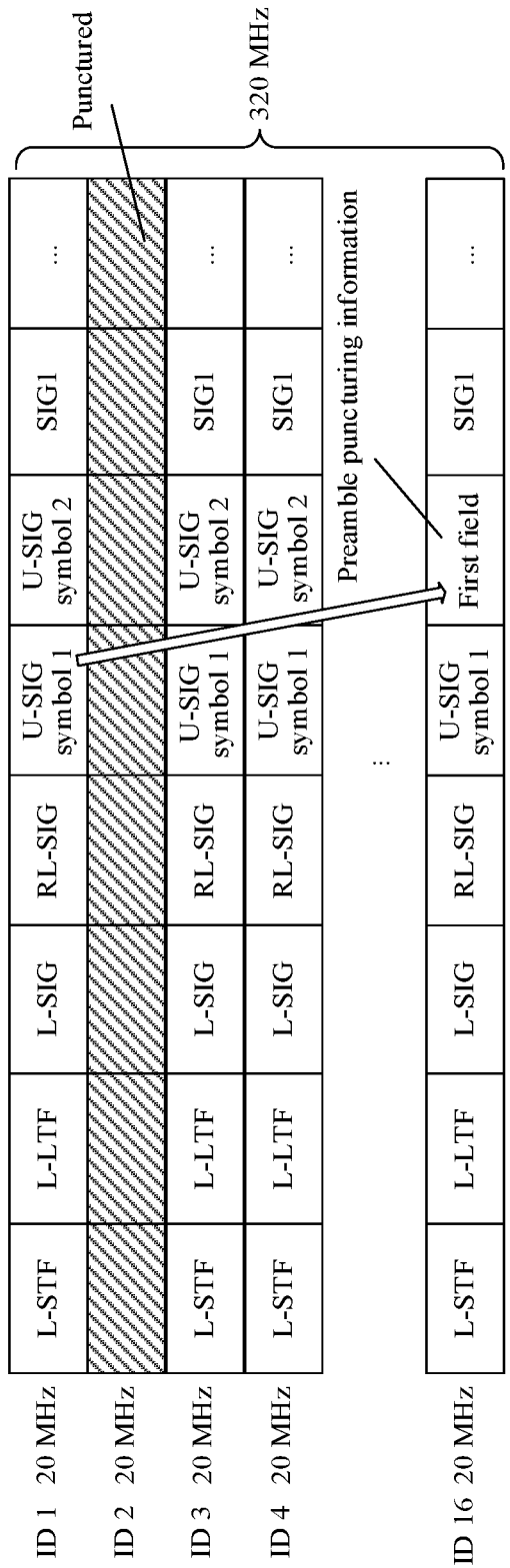
FIG. 16 is a schematic diagram of formats of some fields of a PPDU according to an embodiment of this application.

FIG. 16 is a schematic diagram of formats of some fields of a PPDU according to an embodiment of this application. As shown in FIG. 16, location indication information is located in a first symbol of a U-SIG field. The location indication information indicates that a first content channel includes a subchannel corresponding to an ID 16. It is prespecified that preamble puncturing information is located in a second symbol of the U-SIG field. In this case, the second symbol of the U-SIG field is reused as a first field in which the preamble puncturing information is located, and the subchannel corresponding to the ID 16 occupied by the second symbol of the U-SIG field may be used to send the preamble puncturing information.

It may be understood that a format of the universal field in Embodiment 3 may be separately shown in FIG. 6a and FIG. 7a. A CRC subfield and a tail bit subfield are added to the first symbol of the universal field, so that a receive device can obtain the preamble puncturing information by parsing the first symbol.

Embodiment 4

Figure 17:
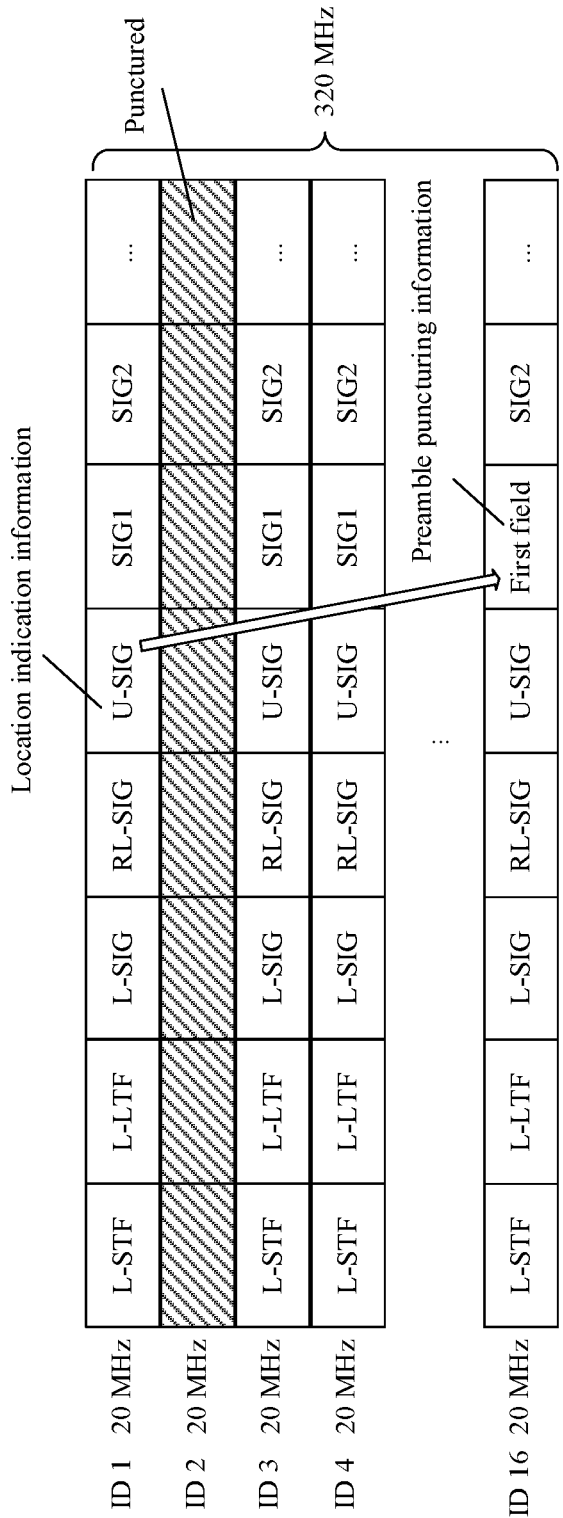
FIG. 17 is a schematic diagram of formats of some fields of a PPDU according to an embodiment of this application.

FIG. 17 is a schematic diagram of formats of some fields of a PPDU according to an embodiment of this application. As shown in FIG. 17, location indication information is located in a U-SIG field, and a time-frequency resource originally used by a SIG1 field is reused as a first field in which preamble puncturing information is located. In addition, it may be prespecified that the preamble puncturing information is located in a first field after the U-SIG field.

It may be understood that a format of the universal field in Embodiment 4 may be separately shown in FIG. 6b and FIG. 7b.

Whether the location indication information is specifically located in a first symbol or a second symbol of the U-SIG field is not limited in this embodiment of this application.

Embodiment 5

Figure 18A:
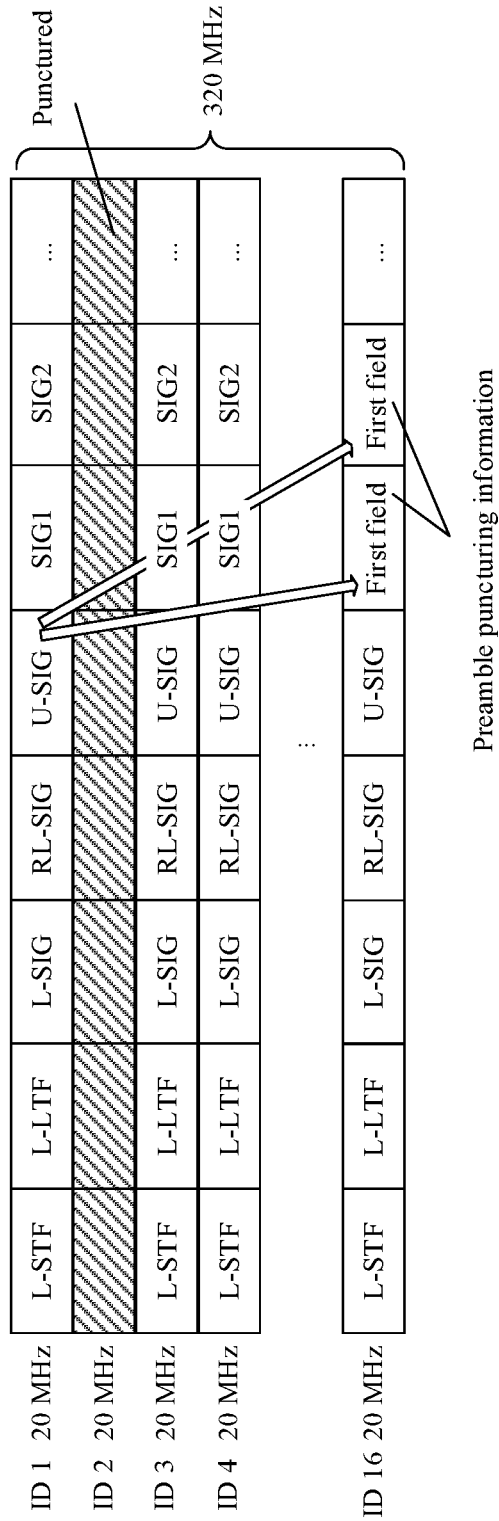
FIG. 18a is a schematic diagram of formats of some fields of a PPDU according to an embodiment of this application.
Figure 18B:
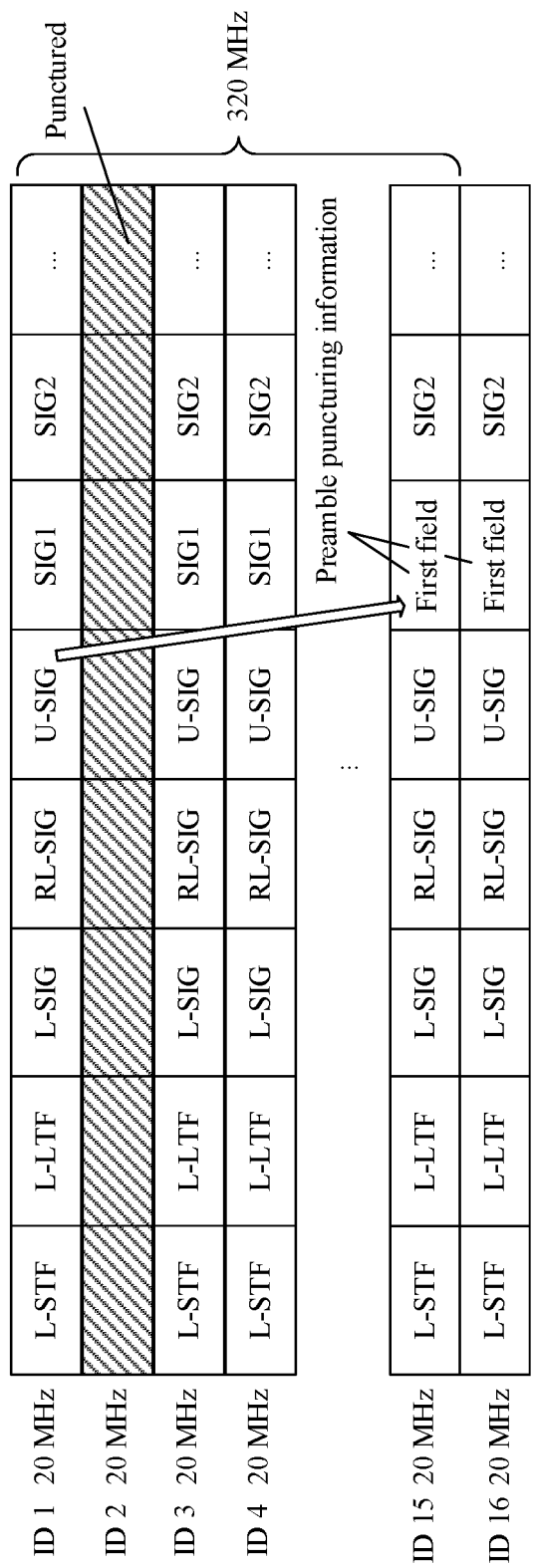
FIG. 18b is a schematic diagram of formats of some fields of a PPDU according to an embodiment of this application.

FIG. 18a and FIG. 18b are schematic diagrams of formats of some fields of a PPDU according to an embodiment of this application. In this embodiment of this application, it may be prespecified that preamble puncturing information is located in a first field and a second field after a U-SIG field. As shown in FIG. 18a, a first content channel and a second content channel may be distinguished in a SIG1 field and a SIG2 field in FIG. 18a. For example, a subchannel corresponding to an ID 16 may be the first content channel, and subchannels corresponding to an ID 1 to an ID 15 may be the second content channel.

As shown in FIG. 18b, location indication information may indicate that a frequency domain location of the first content channel is the subchannel corresponding to the ID 15 and/or the ID 16. For example, the location indication information may indicate that the first content channel includes the subchannel corresponding to the ID 15, and it may be prespecified that the preamble puncturing information is located in two same fields. In this case, the preamble puncturing information may be located in a first field shown in FIG. 18b.

Embodiment 6

Figure 19:
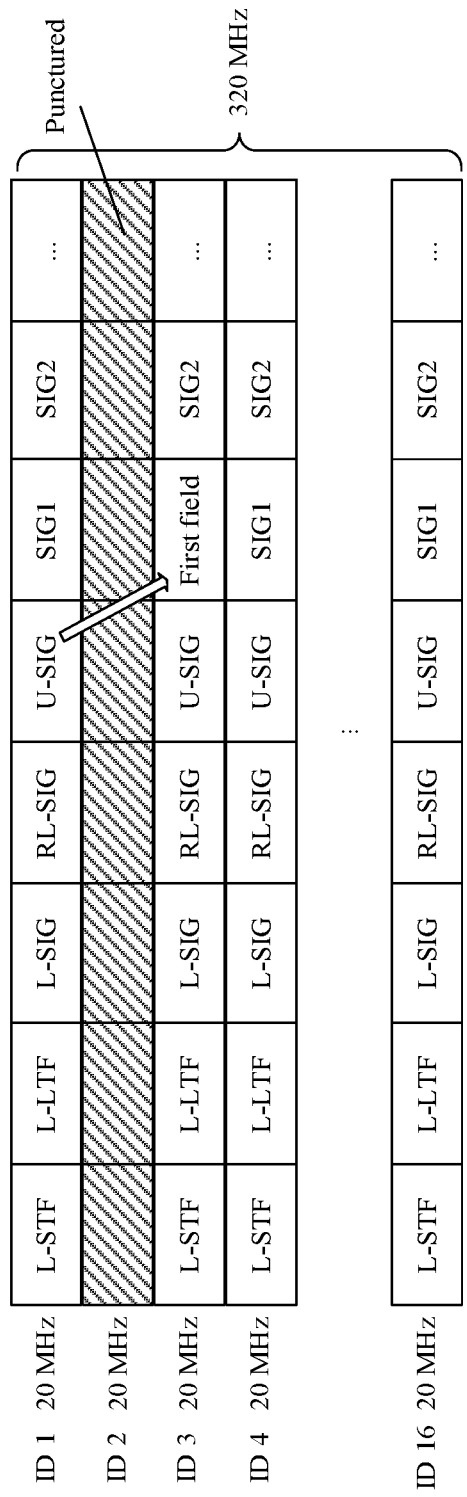
FIG. 19 is a schematic diagram of formats of some fields of a PPDU according to an embodiment of this application.

FIG. 19 is a schematic diagram of formats of some fields of a PPDU according to an embodiment of this application. This embodiment of this application may be applied to a requirement that a receive device supports an operation only on some bandwidths. For example, the receive device supports receiving of the preamble puncturing information only on S20 and/or S40.

If the receive device supports reading of the preamble puncturing information only on S20 and S40, there are two possible scenarios. One is that there are available channels on S20 and S40, and the other is that there is no available channel on S20 and S40. There are available channels on S20 and S40. For example, if S20 and/or S40 are/is not punctured, location indication information may indicate subchannels corresponding to an ID 2 to an ID 4.

As shown in FIG. 20, for example, a corresponding indication may be four bits, where y and z may be two bits each, y may indicate four bandwidths: 40 MHz, 80 MHz, 160 MHz, and 320 MHz, and z may indicate three channels: the ID 2, the ID 3, and the ID 4 (when there are available channels on S20 and S40).

Embodiment 7

Figure 21:
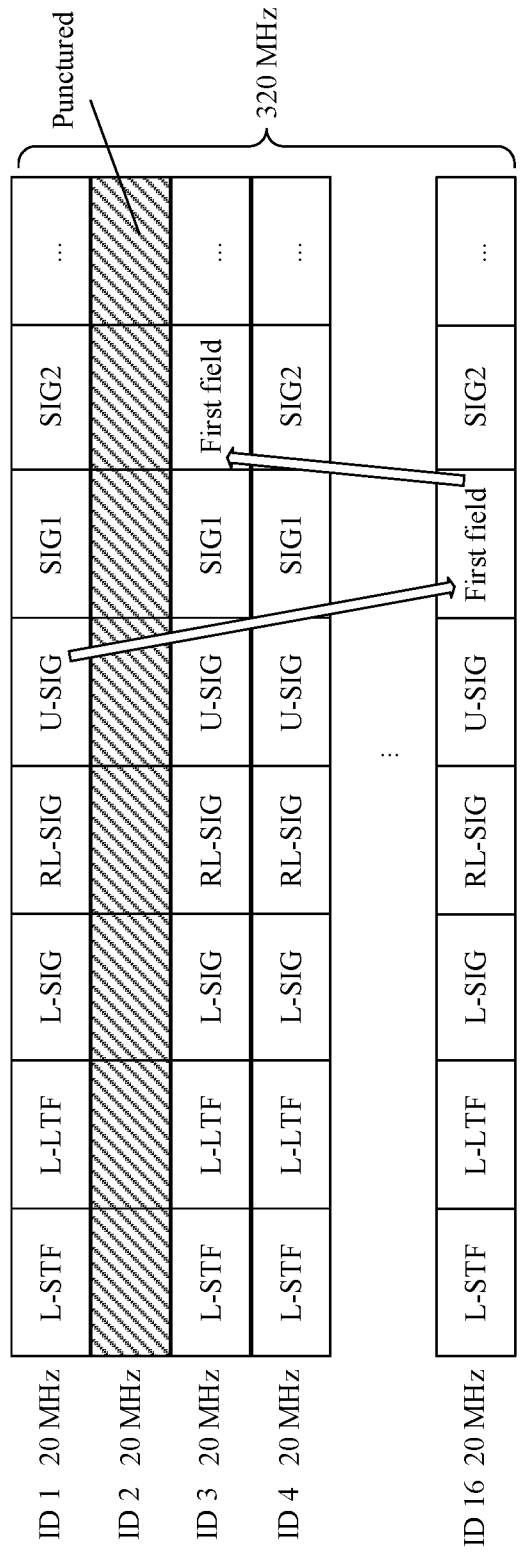
FIG. 21 is a schematic diagram of formats of some fields of a PPDU according to an embodiment of this application.

FIG. 21 is a schematic diagram of formats of some fields of a PPDU according to an embodiment of this application. In this embodiment of this application, preamble puncturing information may be located in more fields. As shown in FIG. 21, a first content channel indicated by location indication information is located on a subchannel corresponding to an ID 16, and the preamble puncturing information is located in a first field. In addition, the first field may further include the location indication information in addition to the preamble puncturing information. The location indication information may indicate a subchannel corresponding to an ID 3, and the preamble puncturing information is located in the first field carried on the subchannel corresponding to the ID 3.

For another example, indication is performed by using the learned preamble puncturing information and other information. For example, if it is known that four channels of a first 80 MHz bandwidth are all used, a transmit device may reuse subchannels corresponding to an ID 2, the ID 3, and an ID 4, and send the preamble puncturing information by using the subchannels corresponding to the ID 2, the ID 3, and the ID 4.

It may be understood that, in the foregoing embodiments, although a bit length of the first field drawn in the accompanying drawing is the same as a bit length of the second symbol of the SIG1 field (or the SIG2 field) or the U-SIG field, the bit length of the first field is not limited in embodiments of this application. For example, the bit length of the first field may alternatively be less than the length of the SIG1 field. For another example, the bit length of the first field may alternatively be less than the bit length of the second symbol of the U-SIG field. In other words, for example, a part or all of the SIG1 field may be reused by the first field.

It may be understood that the first field may include other information in addition to the preamble puncturing information. For example, the other information may include information carried in an HE-SIG-A field and/or an HE-SIG-B field in 802.11ax.

It may be understood that whether a punctured subchannel belongs to the second content channel is not limited in embodiments of this application.

It may be understood that, in the foregoing embodiments, for specific indication manners of the preamble puncturing information and the location indication information, refer to the foregoing description.

The foregoing describes embodiments of this application in detail. The following describes a communication apparatus in this application.

Figure 22:
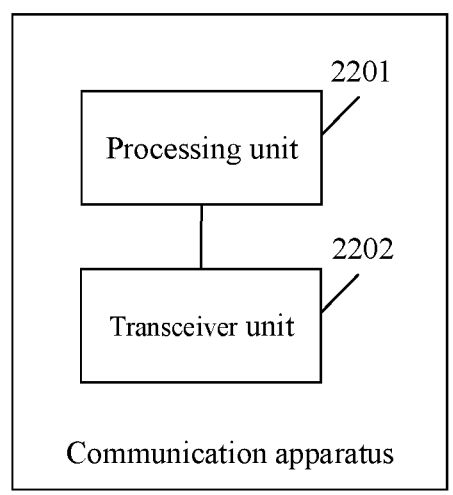
FIG. 22 is a schematic block diagram of a communication apparatus according to an embodiment of this application.

As shown in FIG. 22, the communication apparatus includes a processing unit 2201 and a transceiver unit 2202.

The processing unit 2201 is configured to generate a physical layer protocol data unit (PHY protocol data unit, PPDU) including a preamble, where the preamble includes preamble puncturing information.

The transceiver unit 2202 is configured to send the preamble puncturing information on a first content channel, where a total bandwidth of the first content channel is less than a bandwidth of the PPDU.

The communication apparatus in this embodiment of this application has any function of the transmit device in the foregoing method. Details are not described herein again.

FIG. 22 is reused. In another embodiment, a communication apparatus includes the transceiver unit 2202 and the processing unit 2201.

The transceiver unit 2202 is configured to receive preamble puncturing information on a first content channel, where the preamble puncturing information is included in a preamble of a physical layer protocol data unit (PHY protocol data unit, PPDU), and a total bandwidth of the first content channel is less than a bandwidth of the PPDU.

The processing unit 2201 is configured to determine a usage status of a channel of the PPDU based on the preamble puncturing information.

The communication apparatus in this embodiment of this application has any function of the receive device in the foregoing method. Details are not described herein again.

The foregoing describes the transmit device and the receive device in embodiments of this application. The following describes possible product forms of the transmit device and the receive device. It should be understood that any form of product that has a function of the transmit device in FIG. 22 and any form of product that has a function of the receive device in FIG. 22 fall within the protection scope of embodiments of this application. It should be further understood that the following description is merely an example, and product forms of the transmit device and the receive device in embodiments of this application are not limited thereto.

In a possible product form, the transmit device and the receive device in embodiments of this application may be implemented by using a general bus architecture.

The transmit device includes a processor and a transceiver that is internally connected to and communicates with the processor. The processor is configured to generate a PPDU including a preamble, where the preamble includes preamble puncturing information. The transceiver is configured to send the preamble puncturing information on a first content channel. Further, the transceiver is configured to send the PPDU. Optionally, the transmit device may further include a memory, and the memory is configured to store instructions executed by the processor.

The receive device includes a processor and a transceiver that is internally connected to and communicates with the processor. The transceiver is configured to receive the preamble puncturing information on the first content channel, where the preamble puncturing information is included in the preamble of the PPDU. The processor is configured to determine a usage status of a channel of the PPDU based on the preamble puncturing information. Optionally, the receive device may further include a memory, and the memory is configured to store instructions executed by the processor.

In a possible product form, the transmit device and the receive device in embodiments of this application may be implemented by using a general-purpose processor.

A general-purpose processor that implements the transmit device includes a processing circuit and an output interface that is internally connected to and communicates with the processing circuit. The processing circuit is configured to generate a PPDU that includes a preamble, where the preamble includes preamble puncturing information. The output interface is configured to send the preamble puncturing information. Further, the output interface is configured to send the PPDU. Optionally, the general-purpose processor may further include a storage medium, where the storage medium is configured to store instructions executed by the processing circuit.

A general-purpose processor that implements the receive device includes a processing circuit and an input interface that is internally connected to and communicates with the processing circuit. The input interface is configured to receive a PPDU, where the PPDU includes a preamble, and the preamble includes preamble puncturing information. The processing circuit is configured to determine a usage status of a channel of the PPDU based on the preamble puncturing information. Optionally, the general-purpose processor may further include a storage medium, where the storage medium is configured to store instructions executed by the processing circuit.

In a possible product form, the transmit device and the receive device in embodiments of this application may be further implemented by using one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that transmit devices in the foregoing product forms have any function of the transmit device in the foregoing method embodiment. Details are not described herein again. Receive devices in the foregoing product forms have any function of the receive device in the foregoing method embodiment. Details are not described herein again.

It should be understood that, the term "and/or" in this specification describes only an association relationship between associated objects, and indicates that three relationships may exist. For example, A and/or B may indicate the following three cases: Only A exists, both A and B exist, and only B exists. In addition, the character "/" in this specification generally indicates an "or" relationship between associated objects.

A person of ordinary skill in the art may be aware that, in combination with the examples described in embodiments disclosed in this specification, method steps and units may be implemented by electronic hardware, computer software, or a combination thereof. To clearly describe the interchangeability between hardware and software, the foregoing has generally described steps and compositions of each embodiment according to functions. Whether functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and is sold or used as an independent product, the integrated unit may be stored in a computer-readable storage medium. Based on such an understanding, the technical solutions of embodiments of this application essentially, or the part contributing to the prior art, all or some of the technical solutions may be implemented in a form of a software product. The computer software product is stored in a storage medium, and includes several instructions for instructing a computer device (which may be a personal computer, a server, or a network device) or a processor to perform all or some of the steps of the methods described in embodiments of this application. The foregoing storage medium includes: any medium that can store program code, such as a USB flash drive, a removable hard disk, a read-only memory (ROM), a random-access memory (RAM), a magnetic disk, or an optical disc.

In addition, this application further provides a computer program. The computer program is used to perform an operation and/or processing performed by the transmit device in the puncturing information indication method provided in this application.

This application further provides a computer program. The computer program is used to perform an operation and/or processing performed by the receive device in the puncturing information indication method provided in this application.

This application further provides a computer-readable storage medium. The computer-readable storage medium stores computer instructions. When the computer instructions are run on a computer, the computer is enabled to perform an operation and/or processing performed by the transmit device in the puncturing information indication method provided in this application.

This application further provides a computer-readable storage medium. The computer-readable storage medium stores computer instructions. When the computer instructions are run on a computer, the computer is enabled to perform an operation and/or processing performed by the receive device in the puncturing information indication method provided in this application.

This application further provides a computer program product. The computer program product includes computer code or instructions. When the computer code or the instructions are run on a computer, the puncturing information indication method in the method embodiment of this application is implemented.

This application further provides a computer program product. The computer program product includes computer code or instructions. When the computer code or the instructions are run on a computer, the puncturing information indication method in the method embodiment of this application is implemented.

This application further provides a wireless communication system, including the transmit device and the receive device in embodiments of this application.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A puncturing information indication method, wherein the method comprises:

generating a physical layer protocol data unit (PPDU) comprising a preamble, wherein the preamble comprises location indication information and preamble puncturing information, wherein the preamble puncturing information is carried by a content channel of an extremely high throughput signal (EHT-SIG) field and indicates preamble puncturing status of subchannels of a bandwidth of the PPDU, the location indication information is carried by a universal-SIG (U-SIG) field and indicates a frequency domain location of the content channel, wherein the content channel is distributed on some subchannels of the bandwidth of the PPDU, a bandwidth of the content channel is less than the bandwidth of the PPDU, and the bandwidth of the PPDU is 80 MHz, 160 MHz, or 320 MHz; and sending the PPDU.

2. The method according to claim 1, wherein a bandwidth of each subchannel of the subchannels is 20 MHz.

3. A puncturing information indication method, wherein the method comprises:

receiving a physical layer protocol data unit (PPDU) comprising a preamble, wherein the preamble comprises location indication information and preamble puncturing information, wherein the preamble puncturing information is carried by a content channel of an extremely high throughput signal (EHT-SIG) field and indicates preamble puncturing status of subchannels of a bandwidth of the PPDU, the location indication information is carried by a universal-SIG (U-SIG) field and indicates a frequency domain location of the content channel, wherein the content channel is distributed on some subchannels of the bandwidth of the PPDU, a bandwidth of the content channel is less than the bandwidth of the PPDU, and the bandwidth of the PPDU is 80 MHz, 160 MHz, or 320 MHz; and determining the preamble puncturing status based on the preamble puncturing information.

4. The method according to claim 3, wherein a bandwidth of each subchannel of the subchannels is 20 MHz.

5. An apparatus, comprising:
a memory storing program instructions; and
at least one processor coupled to the memory, wherein the program instructions, when executed by the at least one processor, enable the apparatus to:

generate a physical layer protocol data unit (PPDU) comprising a preamble, wherein the preamble comprises location indication information and preamble puncturing information, wherein the preamble puncturing information is carried by a content channel of an extremely high throughput signal (EHT-SIG) field and indicates preamble puncturing status of subchannels of a bandwidth of the PPDU, the location indication information is carried by a universal-SIG (U-SIG) field and indicates a frequency domain location of the content channel, wherein the content channel is distributed on some subchannels of the bandwidth of the PPDU, a bandwidth of the content channel is less than the bandwidth of the PPDU, and the bandwidth of the PPDU is 80 MHz, 160 MHz, or 320 MHz; and send the PPDU.

6. The apparatus according to claim 5, wherein a bandwidth of each subchannel of the subchannels is 20 MHz.

7. An apparatus, comprising:
a memory storing program instructions; and
at least one processor coupled to the memory, wherein the program instructions, when executed by the at least one processor, enable the apparatus to:

receive a physical layer protocol data unit (PPDU) comprising a preamble, wherein the preamble comprises location indication information and preamble puncturing information, wherein the preamble puncturing information is carried by a content channel of an extremely high throughput signal (EHT-SIG) field and indicates preamble puncturing status of subchannels of a bandwidth of the PPDU, the location indication information is carried by a universal-SIG (U-SIG) field and indicates a frequency domain location of the content channel, wherein the content channel is distributed on some subchannels of the bandwidth of the PPDU, a bandwidth of the content channel is less than the bandwidth of the PPDU, and the bandwidth of the PPDU is 80 MHz, 160 MHz, or 320 MHz; and determine the preamble puncturing status based on the preamble puncturing information.

8. The apparatus according to claim 7, wherein a bandwidth of each subchannel of the subchannels is 20 MHz.

* * * * *